Feb. 8, 1955  C. F. BACHLE  2,701,442
VALVE STRUCTURE FOR PULSE JET ENGINES
Filed May 3, 1947  2 Sheets-Sheet 1
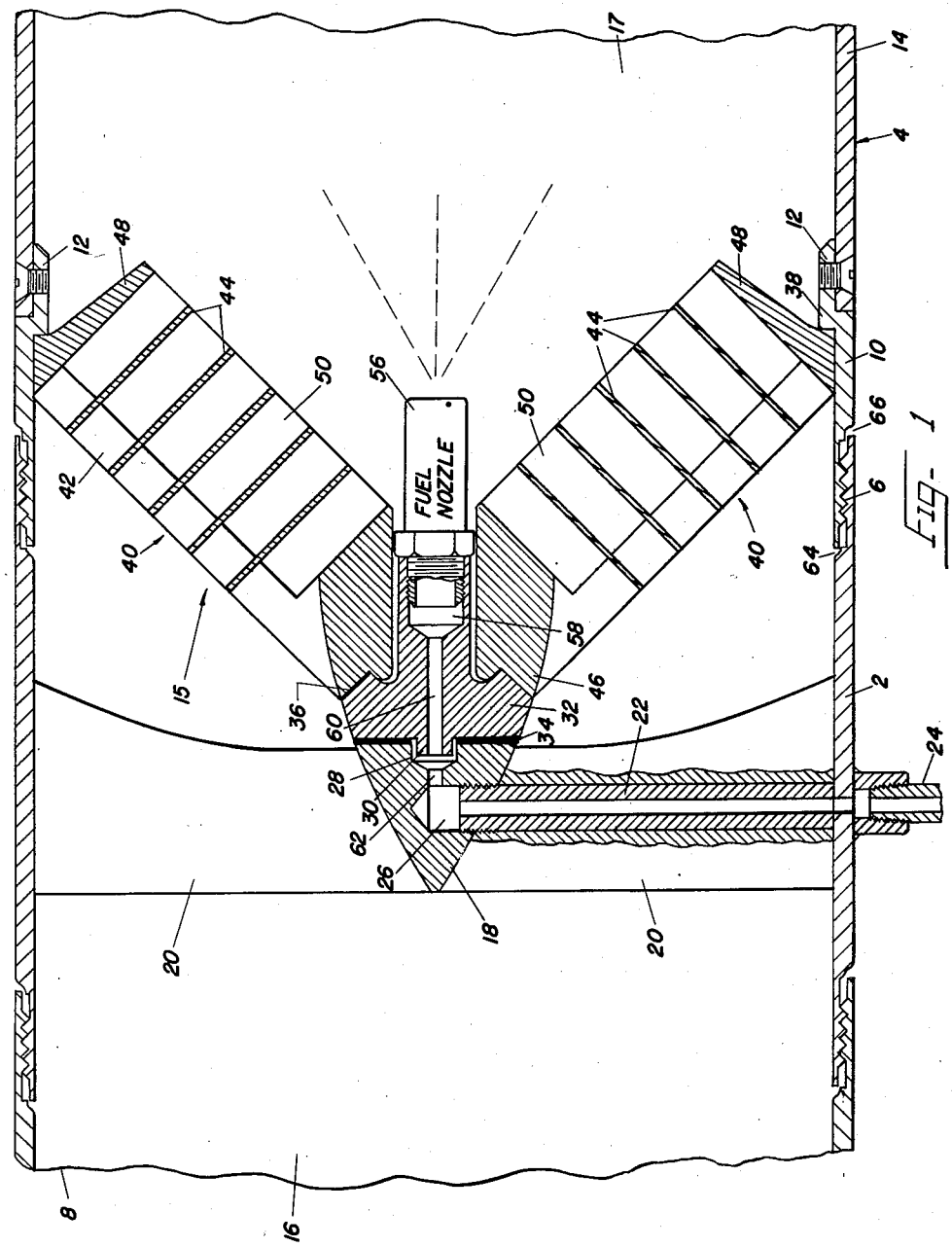
INVENTOR.
CARL F. BACHLE
BY
Hauke & Hardesty
ATTORNEYS Feb. 8, 1955 C. F. BACHLE 2,701,442
VALVE STRUCTURE FOR PULSE JET ENGINES
Filed May 3, 1947 2 Sheets-Sheet 2
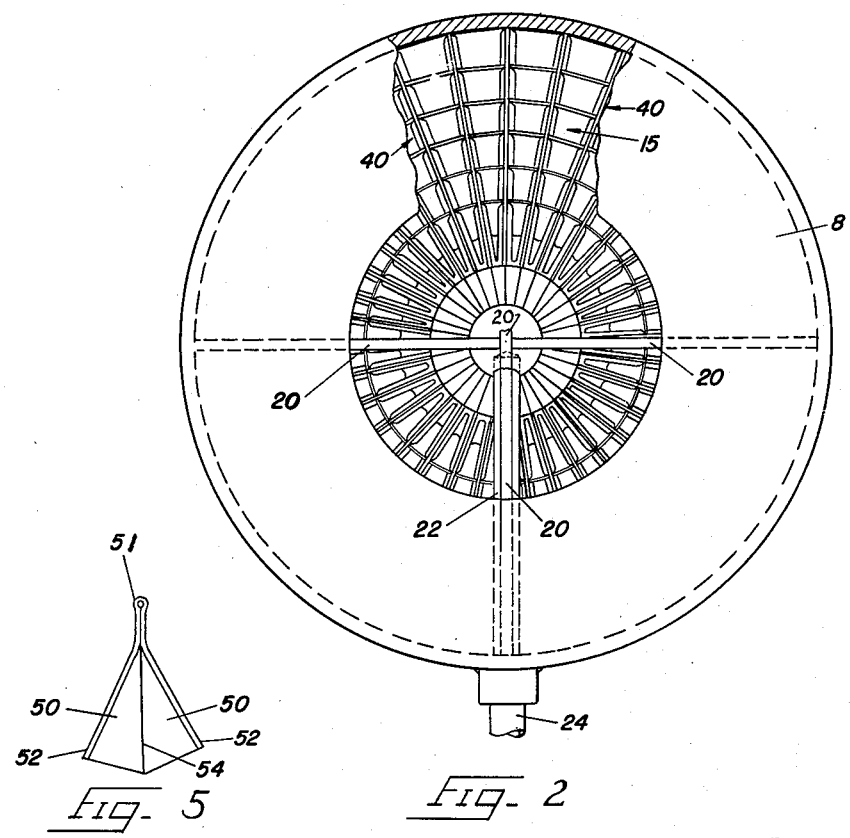
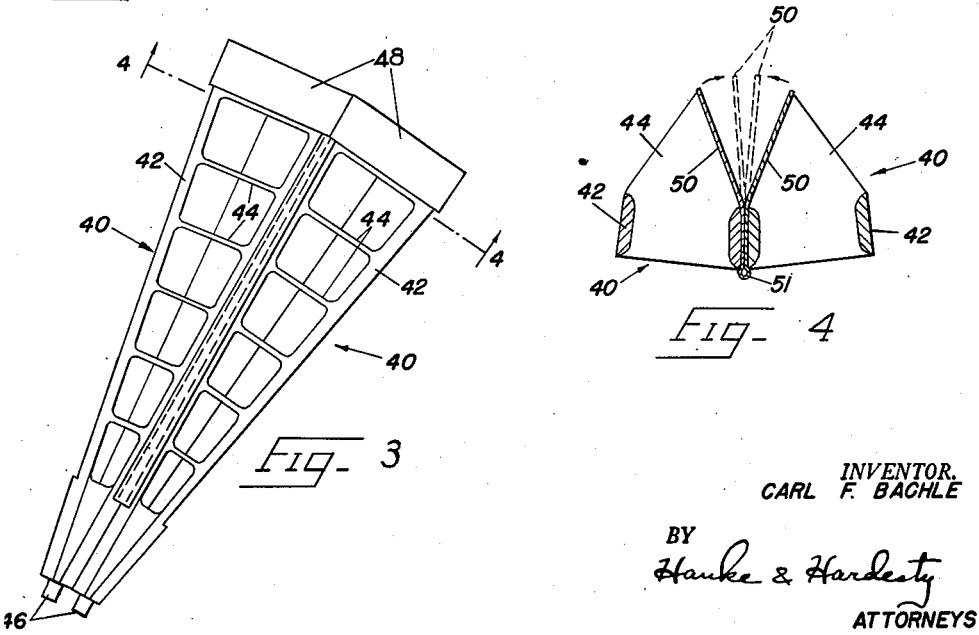
INVENTOR.
CARL F. BACHLE
BY
Hauke & Hardesty
ATTORNEYS

United States Patent Office 2,701,442
Patented Feb. 8, 1955

2,701,442

VALVE STRUCTURE FOR PULSE JET ENGINES

Carl F. Bachle, Detroit, Mich., assignor to Continental Aviation and Engineering Corporation, Detroit, Mich., a corporation of Virginia Application May 3, 1947, Serial No. 745,848

8 Claims. (Cl. 60—35.6)

This invention relates to an internal combustion valve structure for pulse jet engine, especially an engine of the pulse jet type.

In pulse jet engines, a combustion chamber and an air chamber are separated by one or more valves which open and close at a high frequency rate to admit air into the combustion chamber. These valves are customarily of a thin cross section to give them the desired flexibility. The high impact stresses to which the valves are subjected gives them a relatively short life, and they have to be replaced quite often.

It is an object of this invention to provide a pulse jet internal combustion engine having a valve construction which is such that two adjacent valves seat against each other rather than against a valve seat, and further to provide a simple construction which is easily assembled and dis-assembled for the ready replacement of valves, and which gives maximum air flow area resulting in a minimum of restriction to the air flow.

In the drawings:

Fig. 1 is a longitudinal section through that portion of the internal combustion engine in which the partition which includes the valves is located.

Fig. 2 is a front end elevation view, with parts broken away to expose a portion of the conical partition.

Fig. 3 is an enlarged plan view of two grills shown side by side. In this figure, the grills are shown as though their forward faces formed a plane instead of a cone.

Fig. 4 is a view in section through two adjacent grills substantially on line 4—4 of Fig. 3, and Fig. 5 is an end elevation of a pair of flapper valves as used in this invention.

A two-part shell is shown as made up of a midsection 2 and a rear section 4. Sections 2 and 4 are screwed together by means of a conventional screw thread 6. A nose or diffuser section 8 is provided in front of the midsection 2. The details of the diffuser section are not shown here.

The rear section 4 of the two-part shell may be made in one piece if desired, but is preferably made in two pieces comprising a grill support 10 bolted as at 12 to a tube 14.

The shell is preferably separated by a conical partition indicated generally by the reference numeral 15. Partition 15 divides the shell into an air chamber 16 and a combustion chamber 17. Supported in the midsection part of the two-part shell is a locator 18. Locator 18 is substantially centrally disposed by means of ribs or struts 20. One of the ribs 20 is divided to permit the inclusion of a fuel supply line 22. Fuel line 22 communicates at its outer end with a feed pipe 24 and at its inner end with a bore 26 provided in locator 18.

Locator 18 is centrally recessed as shown at 28 to receive a projection 30 of a substantially centrally mounted hub 32. A gasket 34 is preferably provided between the rear face of locator 18 and the forward face of hub 32.

A substantially conical shoulder 36, facing outwardly and toward the rear, is provided on hub 32. An inwardly extending shoulder 38 is provided on rear section 4 of the two-part shell. As is shown in the drawings, the shoulder 38 is preferably formed integrally with grill support 10.

A plurality of grills 40 are disposed radially about the hub 32 in such a manner that the forward ends of the grills are supported on the conical shoulder 36 and the rearward ends are supported by rear section 4, more specifically, by the grill support 10 and its integral shoulder 38.

As is best seen in Figs. 2 and 3, the grills 40 are tapered so as to form with their forward faces what is substantially a conical surface. Each grill 40 consists of side members 42 and cross members or webs 44. Side members 42 converge together toward forward end 46 and are joined together at their divergent outer ends at 48.

Between each two adjacent grills, there is tightly clamped a pair of flapper valves 50. Flapper valves 50 are preferably formed integrally in pairs, being joined together at their forward ends by means of a loop 51. Because of the taper of the grills necessitated by the conical structure of the partition, each valve 50 is twisted or warped in shape so as to make it lie throughout its length against the cross pieces 44, in order that the cooperating edges of adjacent valves may effect a complete closure. This twisting of the valve accounts for the appearance of Fig. 5. The edge 52 seen in Fig. 5 lies adjacent the end 48 of its cooperating grill, while the edge indicated at 54 in Fig. 5 lies adjacent the inner, forward end of its cooperating grill.

A fuel nozzle 56 is carried by hub 32 by being threaded into a large bore 58 in the rear of the hub. Bore 58 communicates with a smaller bore 60 in the forward end of the hub. Bore 60 communicates with bore 26 in locator 18 by means of a cooperating bore 62 in the locator.

The grills are held tightly in place between shoulders 36 and 38 by means of the screw thread 6. To insure that adequate pressure will be applied to the shoulders to hold the grills tight, the screw thread 6 is provided with ample clearance at its ends as is indicated at 64 and 66.

A suitable igniter, not shown, may be provided in the rear section 4 of the two part shell at any satisfactory point in the combustion chamber.

Operation

In operation, the pressure in the combustion chamber alternately rises and falls with the combustion cycles. During the low pressure part of a cycle, air rushes through the grills past the valves 50, which deflect for this purpose into the dotted line positions shown in Fig. 4. Thus the valves are cooled somewhat from the high temperature to which they were just exposed during the high temperature part of the combustion cycle. As the mixture in the combustion chamber ignites, pressure in the combustion chamber rises, permitting the inherent elasticity of the valves to close them to enable pressure to build up to a maximum in the combustion chamber during combustion of the gases. Fuel is admitted to the combustion chamber by means of fuel nozzle 56.

As the valves open and close, two adjacent valves seat against each other rather than against a fixed seat. This avoids a considerable amount of shock due to impact, and eliminates many destructive stresses.

The shell is easily dis-assembled for inspection and valve replacement by the removal of tube 14 from the grill support 10. Grill support 10 may then be unscrewed from midsection 2 to permit complete dis-assembling of the conical partition and consequent removal of the valves. The disassembly and re-assembly of this construction is greatly facilitated by the simplicity of the design.

I claim:

1. An intake valve structure for a pulse jet engine comprising axially separable shell portions of substantially equal diameters, a hub supported by one of said shell portions and substantially centered therein, a generally conically shaped grill structure comprising a plurality of generally triangularly shaped grill members seated at one end on the hub and at the other end on said other shell portion, and a plurality of flapper valves associated with the grill structure.

2. An intake valve structure for a pulse jet engine comprising axially separable shell portions, a hub supported by one of said shell portions and provided with a conical seat facing radially outwardly and rearwardly towards said other shell portion, a plurality of generally triangularly shaped grill members whose apex ends are seated on said conical seat carried by the hub and whose base ends are seated on said other shell portion, and a plurality of flapper valves associated with said grill members and cooperating therewith to define a partition dividing the shell into an air chamber and a combustion chamber, said valves operable to open and close in response to pulsations of pressure in said combustion chamber.

3. An intake valve structure for a pulse jet engine comprising axially separable shell portions, a hub supported by one of said shell portions and provided with a conical seat facing radially outwardly and rearwardly towards said other shell portion, a plurality of generally triangularly shaped grill members whose apex ends are seated on said conical seat carried by the hub and whose base ends are seated on said other shell portion, and a plurality of flapper valves associated with said grill members and cooperating therewith to define a partition dividing the shell into an air chamber and a combustion chamber, said valves operable to open and close in response to pulsations of pressure in said combustion chamber, said other shell portion having a shoulder against which said grill members are seated, said shell portions being secured together against axial separation to clamp the grill members therebetween.

4. An intake valve structure for a pulse jet engine comprising axially separable shell portions, a hub supported by one of said shell portions and provided with a conical seat facing radially outwardly and rearwardly towards said other shell portion, a plurality of generally triangularly shaped grill members whose apex ends are seated on said conical seat carried by the hub and whose base ends are seated on said other shell portion, and a plurality of flapper valves associated with said grill members and cooperating therewith to define a partition dividing the shell into an air chamber and a combustion chamber, said valves operable to open and close in response to pulsations of pressure in said combustion chamber, said other shell portion having a shoulder against which said grill members are seated, said shell portions being secured together against axial separation to clamp the grill members therebetween, said hub comprising a centrally disposed locator member, radially extending fins carried by said first mentioned shell portion for supporting said locator, said other hub member carrying said conical seat piloted in said locator.

5. An intake valve structure for a pulse jet engine comprising axially separable shell portions, a hub supported by one of said shell portions and provided with a conical seat facing radially outwardly and rearwardly towards said other shell portion, a plurality of generally triangularly shaped grill members whose apex ends are seated on said conical seat carried by the hub and whose base ends are seated on said other shell portion, and a plurality of flapper valves associated with said grill members and cooperating therewith to define a partition dividing the shell into an air chamber and a combustion chamber, said valves operable to open and close in response to pulsations of pressure in said combustion chamber, said other shell portion having a shoulder against which said grill members are seated, said shell portions being secured together against axial separation to clamp the grill members therebetween, said hub comprising a centrally disposed locator member, radially extending fins carried by said first mentioned shell portion for supporting said locator, said other hub member carrying said conical seat piloted in said locator, said hub members having communicating fuel passages, one said radially extending fin carrying a fuel conduit adapted to be connected with a source of fuel supply and with the fuel passages in said hub, and a fuel nozzle secured to said other hub member in registration with the fuel passage and discharging into the combustion chamber formed by said shell portions.

6. In a pulse jet engine having a shell and a valved grill structure supported in said shell and forming a partition separating said shell into an air chamber and a combustion chamber, said valved grill structure comprising a plurality of separable segmental grills and flapper valves clamped between adjacent grills and operable to flutter in response to pulsations of pressure in said combustion chamber to alternately seat and unseat on the grill, said valves opening towards each other, the opening movement of said valves being limited by reason of said valves contacting each other.

7. In a pulse jet engine having a shell and a valved grill structure supported in said shell and forming a partition separating said shell into an air chamber and a combustion chamber, said valved grill structure comprising a plurality of angular segmental grill portions each having transverse ribs and openings intermediate the ribs, flapper valves of spring material secured between adjacent grill portions and disposed to normally seat on said ribs to close the intermediate grill openings, said valves operable to flutter in response to pulsations of pressure in said combustion chamber to alternately seat and unseat on the grill, a pair of such valves secured back to back between the adjacent grill portions aforesaid and opening towards each other, the opening movement of said valves being limited by reason of said valves contacting each other.

8. In a pulse jet engine having a shell and a valved grill structure supported in said shell and forming a partition separating said shell into an air chamber and a combustion chamber, said valved grill structure comprising a plurality of angular segmental grill portions each having transverse ribs and openings intermediate the ribs, flapper valves of spring material secured between adjacent grill portions and comprising one piece of spring material folded back to back to provide a pair of flap valves disposed to normally seat on said ribs to close the intermediate grill openings, said flap valves operable to flutter in response to pulsations of pressure in said combustion chamber to alternately seat and unseat on the grill, the opening movement of said valves being limited by reason of said valves contacting each other back to back when in full open position.

References Cited in the file of this patent

UNITED STATES PATENTS

| | | |
|---|---|---|
| 2,142,601 | Bleecker | Jan. 3, 1939 |
| 2,297,942 | Collins | Oct. 6, 1942 |
| 2,432,213 | Rutishauser | Dec. 9, 1947 |

FOREIGN PATENTS

| | | |
|---|---|---|
| 640,228 | Germany | Dec. 28, 1936 |

OTHER REFERENCES

"Wasted Talent" in "Flight," October 5, 1944, page 366.